United States Patent
Takamura et al.

(10) Patent No.: US 7,011,744 B2
(45) Date of Patent: Mar. 14, 2006

(54) BRINE SUPPLY UNIT

(75) Inventors: Tomio Takamura, Yamaguchi (JP);
Tadashi Hirayama, Yamaguchi (JP);
Yoshiyuki Ikemura, Yamaguchi (JP);
Masahiko Tamaru, Yamaguchi (JP);
Yasumi Sago, Tokyo (JP); Masayoshi Ikeda, Tokyo (JP); Kazuaki Kaneko, Tokyo (JP); Jun Miyaji, Fukuoka (JP);
Noriaki Tateno, Fukuoka (JP)

(73) Assignees: Choshu Industry Co., Ltd., Onoda (JP); Anelva Corporation, Tokyo (JP)

( * ) Notice: Subject to any disclaimer, the term of this patent is extended or adjusted under 35 U.S.C. 154(b) by 253 days.

(21) Appl. No.: 10/308,164

(22) Filed: Dec. 3, 2002

(65) Prior Publication Data
US 2003/0209609 A1  Nov. 13, 2003

(30) Foreign Application Priority Data
Dec. 4, 2001  (JP)  ............................ 2001-369655

(51) Int. Cl.
*B01D 36/00*  (2006.01)
*F25B 29/00*  (2006.01)
(52) U.S. Cl. ..................... 210/149; 62/201; 165/206; 165/263; 165/288; 210/167; 210/175; 210/263; 236/12.11; 236/12.12
(58) Field of Classification Search .............. 210/149, 210/167, 175, 181, 263; 165/287, 288, 201, 165/206, 263; 236/12.1, 12.11, 12.12; 137/88; 62/201

See application file for complete search history.

(56) References Cited

U.S. PATENT DOCUMENTS

| | | | |
|---|---|---|---|
| 6,286,764 B1 * | 9/2001 | Garvey et al. | 236/12.12 |
| 6,488,847 B1 * | 12/2002 | Sugawara | 210/259 |
| 6,508,068 B1 * | 1/2003 | Ohkawara | 62/185 |
| 6,554,196 B1 * | 4/2003 | Sasayama et al. | 236/12.12 |

FOREIGN PATENT DOCUMENTS

| | | |
|---|---|---|
| JP | 5-164434 | 6/1993 |
| JP | 9-196518 | 7/1997 |
| JP | 2746047 | 2/1998 |
| JP | 2762028 | 3/1998 |
| JP | 11-248269 | 9/1999 |

* cited by examiner

*Primary Examiner*—Joseph Drodge
(74) *Attorney, Agent, or Firm*—Westerman, Hattori, Daniels & Adrian, LLP

(57) ABSTRACT

A brine supply unit for supplying brine to at least one load after controlling the brine so as to meet a target temperature of the load comprises: a heat exchanger disposed at a brine-cooling channel, through which the brine returned from the load flows, for cooling the brine with water for industrial use; a heater disposed at a brine-heating channel formed in parallel with the brine-cooling channel, through which the brine flows, for heating the brine; a mixing section disposed at a connecting portion between the brine-cooling channel and the brine-heating channel, for mixing the cooled brine and the heated brine; and a tank disposed between the mixing section and the load, which has a capacity of about 10 liters or more and is constructed so that the brine can pass therethrough slowly to relieve a sudden temperature change of the brine.

7 Claims, 2 Drawing Sheets

BRINE SUPPLY UNIT

BACKGROUND OF THE INVENTION

1. Field of the Invention

The present invention relates to a brine supply unit for supplying brine (liquid for heat absorbing or heat transmitting) to at least one load after controlling the temperature of the brine so as to meet a target temperature of the load.

2. Description of the Related Art

Brine supply units that use a refrigerator composed of a compressor, a condenser, an expansion valve, and a heat exchanger (evaporator) are well known. In such brine supply units equipped with a refrigerator, brine returned from a load is cooled to a target temperature of the load by the refrigerator and is again supplied to the load.

Since the foregoing conventional brine supply units with a refrigerator use a refrigerator, the running costs including the electric power consumption of the unit increase, and the size of the unit is increased because of the presence of the refrigerator. However, on the other hand, it is extremely difficult to control the temperature of the brine at high accuracy without using the refrigerator. Thus, the brine could not be stably cooled without using the refrigerator.

SUMMARY OF THE INVENTION

The present invention has been made in view of the problems of the conventional art. Accordingly, it is an object of the present invention to provide a brine supply unit capable of stably controlling the temperature of brine while reducing the running costs including the power consumption of the unit and decreasing the size of the unit.

According to the present invention, there is provided a brine supply unit for supplying brine to at least one load in circulation after controlling the temperature of the brine so as to meet a target temperature of the load, comprising: a heat exchanger disposed at a brine-cooling channel, through which the brine returned from the load flows, for cooling the brine with water for industrial use (industrial water); a heater disposed at a brine heating channel formed in parallel with the brine-cooling channel, through which the brine returned from the load flows, for heating the brine; a mixing section disposed at a connecting portion between the brine-cooling channel and the brine-heating channel, for mixing the brine cooled with the heat exchanger and the brine heated with the heater; a mixing-section-outlet-side temperature sensor disposed at the outlet of the mixing section for measuring the temperature of the brine from the mixing section; a mixing control unit for controlling the mixing ratio of the brine cooled with the heat exchanger and the brine heated with the heater on the basis of the output from the mixing-section-outlet-side temperature sensor; and a tank disposed between the mixing section and the load, the tank having a capacity of about 10 liters or more, and being constructed such that the brine passes therethrough at a low speed in order to relieve a sudden temperature change of the brine from the mixing section.

Preferably, the brine supply unit according to the present invention further comprises: a heat-exchanger-outlet-side temperature sensor disposed at the outlet of the heat exchanger for measuring the temperature of the brine from the heat exchanger; and a valve for controlling the flow rate of the water for industrial use to be supplied to the heat exchanger on the basis of the output from the heat-exchanger-outlet-side temperature sensor.

Preferably, the brine supply unit according to the present invention further comprises: a heating-channel-outlet-side temperature sensor disposed at the outlet of the heating channel for measuring the temperature of the brine from the heating channel; and an electric-power control unit for controlling electric power to be supplied to the heater on the basis of the output from the heating-channel-outlet-side temperature sensor.

Preferably, in the brine supply unit according to the present invention, the mixing section includes a three-directional valve for alternately switching the supply of the brine cooled with the heat exchanger to the load and the supply of the brine heated with the heater to the load.

Preferably, in the brine supply unit according to the present invention, a tank-outlet-side temperature sensor is disposed at the outlet of the tank for measuring the temperature of the brine from the tank, and the mixing control unit controls the mixing ratio of the brine cooled with the heat exchanger and the brine heated with the heater on the basis of the output from the mixing-section-outlet-side temperature sensor and the output from the tank-outlet-side temperature sensor.

Preferably, in the brine supply unit according to the present invention, the brine is pure water; and the tank is an ion exchanger disposed between the mixing section and the load, the ion exchanger having a capacity of about 10 liters or more, having therein a ion exchanging section filled with granular ion exchange resins so as to maintain the electrical conductivity of the pure water at a predetermined value or less, and being constructed such that the pure water can pass through the ion exchanging section at a low speed in order to relieve a sudden temperature change of the pure water from the mixing section.

DESCRIPTION OF THE PREFERRED EMBODIMENTS

Figure 1:
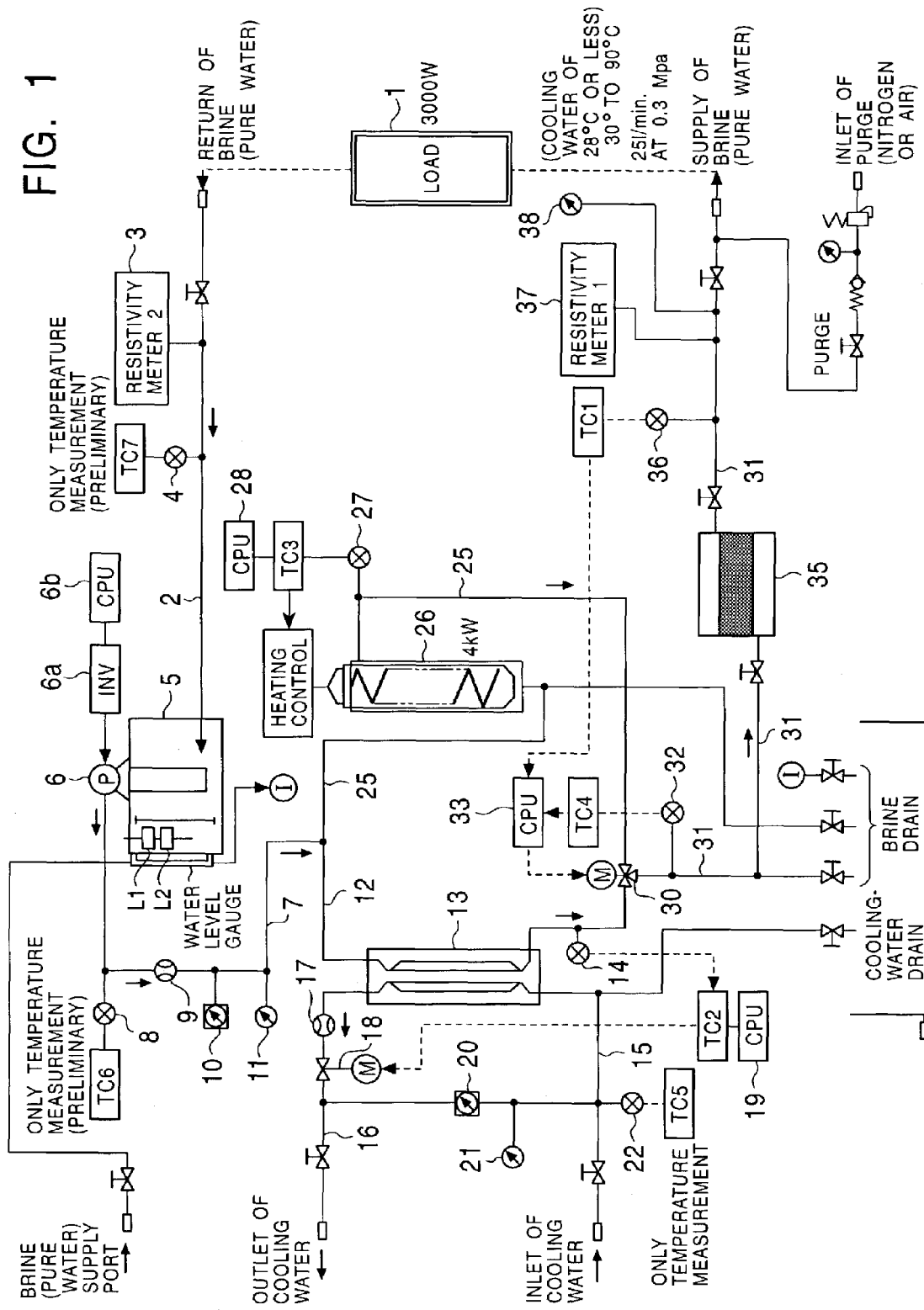
FIG. 1 is a piping block diagram of a brine supply unit according to an embodiment of the present invention.

An embodiment of the present invention will be described. FIG. 1 is a piping block diagram of a brine supply unit for supplying pure water serving as brine to a load such as a semiconductor-manufacturing unit, according to an embodiment of the present invention.

Referring to FIG. 1, there are shown a load 1 such as a semiconductor manufacturing unit; a return channel 2 for transporting pure water, which has completed a function as brine for the load 1, from the load 1 to a brine supply unit; a resistivity meter 3 disposed at the return channel 2 for measuring the resistance (electrical conductivity) of the pure water; a temperature sensor 4 disposed at the return channel 2 for preliminarily measuring the temperature of the pure water; a pure water tank 5 for temporarily storing the pure water from the return channel 2; a pump 6 for pumping the pure water in the pure water tank 5 to the following channel 7; an inverter 6a for converting the frequency of electric power for driving the pump 6; a controller (CPU) 6b for controlling the inverter 6a; a channel 7 for feeding the pure water discharged from the pump 6 to the following heat exchanger 13 or the following heater 26; a temperature sensor 8 for preliminarily measuring the temperature of the pure water flowing in the channel 7; a flow rate sensor 9 for measuring the flow rate of the pure water flowing in the channel 7; a pressure switch 10 for measuring the pressure of the pure water flowing in the channel 7 and stopping the whole unit when detecting abnormality such as blockage in a pipe; and a pump discharge pressure gauge 11 for preliminarily measuring the discharge pressure of the pump 6 by the amount of the flow of the pure water in the channel 7.

Referring to FIG. 1, there are also shown a pure-water cooling channel 12 which is one of two channels branching from the channel 7; a heat exchanger 13 disposed in the middle of the pure-water cooling channel 12 for cooling the pure water; and a temperature sensor 14 disposed in the middle of the pure-water cooling channel 12 for measuring the temperature of the pure water cooled with the heat exchanger 13.

The heat exchanger 13 is supplied with water for industrial use (factory circulating water) as cooling water constantly, which is maintained at a mean temperature of, for example, about 20 to 28° C. The heat exchanger 13 cools the pure water flowing in the pure-water cooling channel 12 with the water for industrial use.

Referring to FIG. 1, there are also shown a cooling-water feed pipe 15 for taking water for industrial use from the exterior into the heat exchanger 13; a cooling-water discharge pipe 16 for discharging the water for industrial use used for heat exchange in the heat exchanger 13 to the exterior; a flow rate sensor 17 disposed in the middle of the cooling-water discharge pipe 16; a motor valve 18 disposed in the middle of the cooling-water discharge pipe 16; a controller (CPU) 19 for controlling the degree of opening of the motor valve 18 depending on the output from the temperature sensor 14 for measuring the temperature of the pure water from the heat exchanger 13 to regulate the flow rate of the water for industrial use to be supplied to the heat exchanger 13 (thereby varying the cooling capacity of the heat exchanger 13); a cooling-water differential pressure switch 20 for measuring the difference of water pressure between the water pressure in the cooling-water feed pipe 15 and the water pressure in the cooling-water discharge pipe 16 and stopping the whole unit when detecting abnormality such as blockage in a pipe; a cooling-water pressure gauge 21 for preliminarily measuring the pressure of the pure water flowing in the cooling-water feed pipe 15; and a temperature sensor 22 for measuring the temperature of the water for industrial use in the cooling-water feed pipe 15.

Referring to FIG. 1, there are also shown a pure-water heating channel 25 that is the other channel of the two channels branching from the channel 7 and is arranged in parallel with the pure-water cooling channel 12; a heater 26 disposed in the middle of the pure-water heating channel 25; a temperature sensor 27 for measuring the temperature of the pure water heated with the heater 26; and a controller (CPU) 28 for controlling the heating value of the heater 26.

Referring to FIG. 1, there are also shown a motor-driven three-directional valve 30 disposed at a position where the pure-water cooling channel 12 and the pure-water heating channel 25 join and connect to the following feed channel 31. The feed channel 31 is arranged between the motor-driven three-directional valve 30 and the load 1. The three-directional valve 30 varies the flow rate of the pure water flowing into the feed channel 31 from the pure-water cooling channel 12 and the flow rate of the pure water flowing into the feed channel 31 from the pure-water heating channel 25 by controlling the degree of opening of the valve.

Referring to FIG. 1, there are also shown a temperature sensor 32 disposed at the outlet of the three-directional valve 30 for measuring the temperature of the pure water mixed at the three-directional valve 30; and a controller (CPU) 33 for controlling the three-directional valve 30 depending on the output from the temperature sensor 32 and the output from the following temperature sensor 36 for measuring the temperature of pure water from the following ion exchanger 35.

According to this embodiment, the controller (CPU) 33 controls the three-directional valve 30, so that the mixing ratio of the cooled pure water from the pure-water cooling channel 12 and the heated pure water from the pure-water heating channel 25 is controlled; thus, pure water whose temperature is suitably regulated can be supplied to the feed channel 31.

Referring again to FIG. 1, the ion exchanger 35 is disposed in the middle of the feed channel 31 and is constructed so as to maintain the electrical conductivity of the pure water mixed by the three-directional valve 30 at a predetermined value or less. The ion exchanger 35 includes an ion exchanging section filled with granular ion exchange resins 35d placed between a disk-shaped net 35b at the lower part in a cylindrical vessel 35a and a disk-shaped net 35c at the upper part in the vessel 35a, as shown in FIG. 2.

Figure 2:
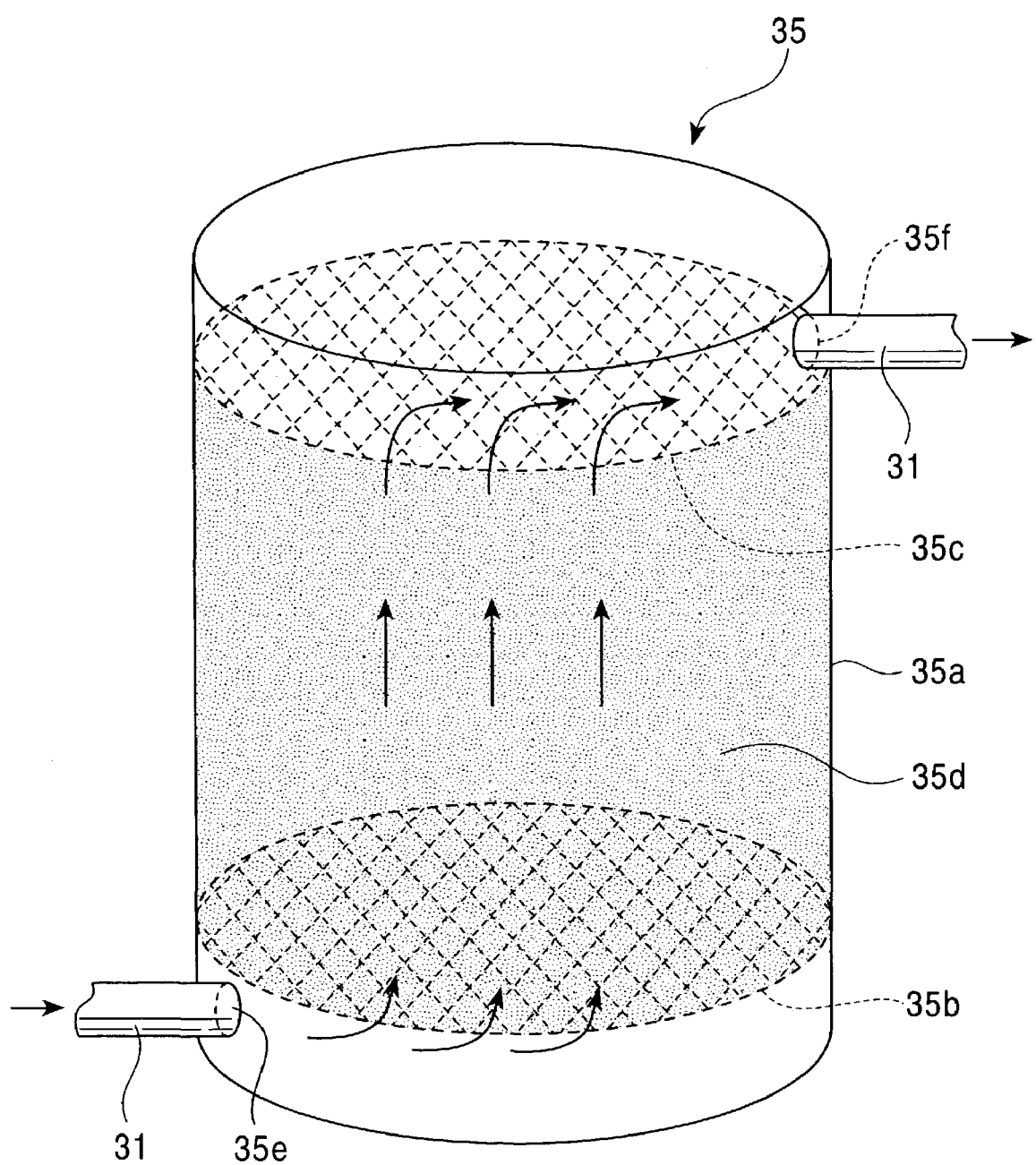
FIG. 2 is an explanatory view of the arrangement of an ion exchanger used in this embodiment.

Referring to FIG. 2, there are shown an inlet hole 35e formed between the bottom of the vessel 35a and the net 35b for admission of the pure water from the feed channel 31 into the vessel 35a; and an outlet hole 35f formed between the top face of the vessel 35a and the net 35c for return of the pure water that has flowed into through the inlet hole 35e and passed through the ion exchange resins 35d slowly to the feed channel 31.

In this way, almost all of the vessel 35a except a necessary space for the inlet hole 35e and the outlet hole 35f is filled with the ion exchange resins 35d. In other word, the ion exchanging section filled with the ion exchange resins 35d is disposed at most of the space of the ion exchanger 35 except a necessary space for the inlet hole 35e and the outlet hole 35f.

In this embodiment, the pure water supplied from the three-directional valve 30 to the feed channel 31 flows into the vessel 35a through the inlet hole 35e near the bottom of the vessel 35a, then passes slowly through the ion exchange resins 35d (the ion exchanging section), passes through the outlet hole 35f near the top face of the vessel 35a, and is then returned to the feed channel 31. While the pure water passes through the ion exchange resins 35d (the ion exchanging section) slowly, the temperature of the pure water is gradually brought into appropriate one.

Therefore, in this embodiment, even if the pure water coming from the three-directional valve 30 changes in temperature suddenly, the sudden temperature change is reduced while the pure water passes slowly through the ion exchange resins 35d (the ion exchanging section); thus, the temperature of the pure water is brought into appropriate one before the pure water is supplied to the load 1.

The vessel 35a of the ion exchanger 35 is formed so as to have, for example, a diameter of 220 mm, a height of 365 mm, and a capacity of about 14 liters. In this embodiment, the reason why the capacity of the ion exchanger 35 is about 14 liters is that the pure water can flow in the ion exchanger 35 slowly, so that, when the temperature of the pure water mixed by the three-directional valve 30 changes suddenly, the sudden temperature change of the pure water can be reduced gradually into appropriate one and then the pure water can be supplied to the load 1.

Thus, in this embodiment, the ion exchanger 35 has a buffering function of relieving the sudden temperature change of the pure water flowing from the three-directional valve 30.

This is pertinent to the fact that this embodiment uses no refrigerator as in the conventional brine supply unit.

That is to say, since the conventional brine supply unit using a refrigerator controls the temperature of brine with a refrigerator at high accuracy, it is not normally conceivable that the temperature of the brine to be supplied to the load 1 would change suddenly. However, as in this embodiment, when the temperature of pure water as brine is intended to be controlled with the heat exchanger 13 using water for industrial use and the heater 26 without using a refrigerator, the temperature of the pure water to be supplied to the load 1 could change suddenly with high probability.

Particularly, as in this embodiment, when the cooled pure water flowing from the pure-water cooling channel 12 and the heated pure water flowing from the pure-water heating channel 25 are mechanically mixed using the three-directional valve 30, the temperature of the pure water supplied from the three-directional valve 30 may change suddenly with high probability because of, for example, delay of the operation timing of the valve-opening control motor of the three-directional valve 30.

When the temperature of the pure water may change suddenly, it becomes necessary to interpose a buffer such as a large-capacity pure-water tank for relieving the sudden temperature change of the pure water. However, this increases the size of the entire brine supply unit. Therefore, in this embodiment, the ion exchanger 35 for maintaining the electrical conductivity of the pure water under a predetermined value is interposed in the middle of the feed channel 31 between the three-directional valve 30 and the load 1, the ion exchanger 35 having a capacity of 14 liters and functioning as a buffer; thus, an increase in the size of the entire brine supply unit is prevented.

Our experiment has shown that when the pure water is supplied to the load 1 at a flow rate of 5 lit/min., the flow speed of the pure water in the ion exchanger 35 is 0.0022 m/s; when the pure water is supplied to the load 1 at a flow rate of 10 lit/min., it is 0.0044 m/s; when the pure water is supplied to the load 1 at a flow rate of 20 lit/min., it is 0.0088 m/s; and when the pure water is supplied to the load 1 at a flow rate of 25 lit/min., it is 0.011 m/s.

In this embodiment, even if sudden temperature change of the pure water occurs, when the pure water flows in the ion exchanger 35 at a speed of as low as about 0.2 m/s or less, for example, 0.011 m/s, the sudden temperature change of the pure water would be relieved within the flow time; thus, the ion exchanger 35 can sufficiently fulfill the function as the buffer.

Also, referring again to FIG. 1, there are shown a temperature sensor 36 for measuring the temperature of the pure water flowing from the ion exchanger 35; a resistivity meter 37 for measuring the resistivity (electrical conductivity) of the pure water to be sent to the load 1; and a brine-outlet pressure gauge 38 for measuring the pressure of the pure water to be sent to the load 1.

In this embodiment, a signal sent from the temperature sensor 36 is inputted to the controller (CPU) 33 for controlling the three-directional valve 30. The controller (CPU) 33 controls the three-directional valve 30 on the basis of the temperature of the pure water from the three-directional valve 30 (the output from the temperature sensor 32) and the temperature of the pure water from the ion exchanger 35 (the output from the temperature sensor 36) to appropriately control the mixing ratio of the pure water cooled with the heat exchanger 13 and the pure water heated with the heater 26.

Next, a supplementary explanation of the operation of this embodiment will be given.

In this embodiment, when the target temperature (for example, 30° C.) of the brine of the load 1 is 2° C. higher than the temperature of the water for industrial use (industrial circulating water), the pure water serving as brine is cooled using the water for industrial use (using no refrigerator) so as to meet the target temperature and is supplied to the load 1. On the other hand, in this embodiment, when the target temperature of the brine of the load 1 is not 2° C. higher than the temperature of the water for industrial use, the water for industrial use is not used in this embodiment.

In this embodiment, the controller (CPU) 19 controls the degree of opening of the motor valve 18 on the basis of the output from the temperature sensor 14 for measuring the temperature of the pure water from the heat exchanger 13, so as to control the flow amount of the water for industrial use to be supplied to the heat exchanger 13 and to vary the cooling capacity of the heat exchanger 13 appropriately.

Also, in this embodiment, the pure water returned from the load 1 is divided into two channels of the pure-water cooling channel 12 and the pure-water heating channel 25. In the pure-water cooling channel 12, the temperature of the pure water is controlled by the heat exchanger 13 so as to be slightly lower than the target temperature of the brine of the load 1. In the pure-water heating channel 25, the temperature of the pure water is controlled by the heater 26 so as to be slightly higher than the target temperature of the brine of the load 1.

In this embodiment, the pure water from the pure-water cooling channel 12 and the pure water from the pure-water heating channel 25 are mixed at an optimum mixing ratio by the three-directional valve 30, so that the pure water whose temperature is controlled to meet the target temperature of the brine of the load 1 can be supplied to the load 1.

In this embodiment, particularly, in order to control the mixing ratio of the pure water from the pure-water cooling channel 12 and the pure water from the pure-water heating channel 25, the flow rates of them are mechanically controlled by driving the valve-opening control motor of the three-directional valve 30; thus, the temperature of the pure water after being mixed by the three-directional valve 30 could change suddenly. Therefore, in this embodiment, the ion exchanger 35 is interposed in the middle of the feed channel 31 connecting between the three-directional valve 30 and the load 1, the ion exchanger 35 having a capacity of about 14 liters, being constructed such that the pure water can flow therein slowly, and thus functioning as a buffer for relieving the sudden temperature change of the pure water. Using the ion exchanger 35 prevents the sudden temperature change of the pure water to be supplied to the load 1.

The brine supply unit according to this embodiment is equipped with the following automatically locking system.

(1) The temperature of the water for industrial use is measured at the starting of this embodiment, wherein a possible set temperature is only "the temperature of the water for industrial use +(plus) 2° C." or more. When the temperature of the water for industrial use rises to more than the "set temperature –(minus) 2° C." after the starting of this embodiment, an alarm is issued or the unit is stopped.

(2) The specific resistivity of the pure water is measured at the outlet of the pure water toward the load 1 and the inlet from the load 1. When the specific resistivity at the outlet is lower than the control value, an alarm is issued or the unit is stopped. When the specific resistivity at the inlet is lower than the control value, an alarm is issued or the unit is stopped.

(3) The pressure of the water for industrial use at the inlet of the heat exchanger 13 and the pressure at the outlet are monitored at all times. When "pressure at the inlet −(minus) pressure at the outlet" is lower than the control value, abnormality such as blockage in a pipe is forecasted; therefore, an alarm is issued or the unit is stopped.

In this embodiment described above, although the ion exchanger 35 has a capacity of about 14 liters, the present invention is not limited to that. An ion exchanger having a capacity of at least about 10 liters or more can function sufficiently as a buffer to relieve a sudden temperature change of the pure water while the pure water flows in the ion exchanger at a low speed. The ion exchanger of the present invention is not limited to that having the arrangement shown in FIG. 2. In the present invention, when pure water is not used as brine, a tank having a capacity of about 10 liters or more and constructed so that brine can pass therethrough at a low speed may be used in place of the ion exchanger 35 of FIG. 1.

In this embodiment, the pure water returned from the load 1 is divided into the pure-water cooling channel 12 and the pure-water heating channel 25, and the heat exchanger 13 interposed at the pure-water cooling channel 12 and the heater 26 interposed at the pure-water heating channel 25 are connected in parallel with each other. However, it is also possible to cool the pure water returned from the load 1 with the heat exchanger and then heat the cooled pure water, in other words, to connect the heat exchanger and the heater in series (in this case, although the three-directional valve 30 of FIG. 1 becomes unnecessary, there is still a need for the ion exchanger 35 functioning as a buffer for relieving the sudden temperature change of the pure water heated with the heater).

As described above, in the brine supply unit of the present invention, the brine is not cooled with a refrigerator but cooled with a heat exchanger using water for industrial use. Therefore, the running costs including power consumption can significantly be reduced and also the size of the unit can remarkably be reduced as compared with the conventional units that cool brine using a refrigerator consuming a large amount of power.

When brine is cooled without using a refrigerator but with a heat exchanger using water for industrial use and is heated with a heater, as in the present invention, the temperature of the brine may change suddenly. However, even if the temperature of the brine has changed suddenly, in the present invention, the brine before being supplied to the load passes slowly in the tank having a capacity of about 10 liters or more and, meanwhile, the sudden temperature change of the brine is relieved (the buffering function of the tank). Accordingly, in the present invention, even if the temperature of the brine has changed suddenly, as in the foregoing, the brine can be supplied to the load after being brought to an appropriate temperature.

When pure water serving as brine is cooled without using a refrigerator but with a heat exchanger using water for industrial use and is heated with a heater, the temperature of the pure water may change suddenly. However, even if the temperature of the pure water has changed suddenly, in the present invention, the pure water passes slowly in the ion exchanger having a capacity of about 10 liters or more before being supplied to the load and, meanwhile, the sudden temperature change of the pure water is relieved (the buffering function of the ion exchanger). Therefore, according to the present invention, even if the temperature of the pure water has changed suddenly as in the foregoing, the pure water can be supplied to the load after being brought to an appropriate temperature.

In the present invention, when a three-directional valve is disposed at a portion connecting the cooling channel having the heat exchanger and the heating channel having the heater, both the amount of the brine (pure water) from the cooling channel and the amount of the brine (pure water) from the heating channel can be suitably controlled.

In the present invention, when the mixing ratio of the pure water cooled with the heat exchanger and the pure water heated with the heater is controlled on the basis of the signal from the temperature sensor for measuring the temperature of the pure water from the ion exchanger also having the buffering function, the mixing ratio of the cooled pure water and the heated pure water can optimally be controlled in consideration of the buffering function of the ion exchanger.

What is claimed is:

1. A brine supply unit for supplying brine to at least one load after controlling the temperature of the brine so as to meet a target temperature of the load, comprising:
   a return channel for transporting brine from the load;
   a heat exchanger disposed at a brine-cooling channel which branches from the return channel through which the brine returned from the load flows, wherein the brine is cooled by non-refrigerated industrial water that is taken from the exterior of the brine supply unit, used for heat exchange in the heat exchanger, and discharged to the exterior of the brine supply unit;
   an cooling water feed pipe adapted to supply industrial water to the heat exchanger from an exterior of the brine supply unit, and an cooling water discharge pipe adapted to discharge industrial water used for heat exchange in the heat exchanger to the exterior of the brine supply unit,
   a heat exchanger-outlet-side temperature sensor disposed at an outlet of the heat exchanger for measuring the temperature of the brine from the heat exchanger;
   a controller for controlling the flow rate of the industrial water to be supplied to the heat exchanger depending on the output from the heat exchanger-outlet-side temperature sensor so as to vary the cooling capacity of the heat exchanger,
   a heater disposed at a brine-heating channel formed in parallel with the brine-cooling channel and branching from the return channel, through which the brine returned from the load flows, for heating the brine;
   a mixing section disposed at a connecting portion between the brine-cooling channel and the brine-heating channel, for mixing the brine cooled with the heat exchanger and the brine heated with the heater;
   a mixing-section-outlet-side temperature sensor disposed at the outlet of the mixing section for measuring the temperature of the brine from the mixing section;
   a mixing control unit for controlling the mixing ratio of the brine cooled with the heat exchanger and the brine heated with the heater on the basis of the output from the mixing-section-outlet-side temperature sensor; and
   a tank disposed between the mixing section and the load, said tank having a capacity of about 10 liters or more, and being constructed such that the brine passes therethrough at a low speed in order to relieve a sudden temperature change of the brine from the mixing section.

2. The brine supply unit according to claim 1, further comprising:
a valve for controlling the flow rate of the water for industrial use to be supplied to the heat exchanger on the basis of the output from the heat-exchanger-outlet-side temperature sensor.

3. The brine supply unit according to claim 1, further comprising:
a heating-channel-outlet-side temperature sensor disposed at the outlet of the brine-heating channel for measuring the temperature of the brine from the brine-heating channel; and
an electric-power control unit for controlling electric power to be supplied to the heater on the basis of the output from the heating-channel-outlet-side temperature sensor.

4. The brine supply unit according to claim 1, wherein the mixing section includes a three-directional valve for alternately switching the supply of the brine cooled with the heat exchanger to the load and the supply of the brine heated with the heater to the load.

5. The brine supply unit according to claim 1, further comprising:
a tank-outlet-side temperature sensor disposed at the outlet of the tank for measuring the temperature of the brine from the tank;
wherein the mixing control unit controls the mixing ratio of the brine cooled with the heat exchanger and the brine heated with the heater on the basis of the output from the mixing-section-outlet-side temperature sensor and the output from the tank-outlet-side temperature sensor.

6. The brine supply unit of claim 1,
wherein:
the brine is pure water; and
the tank is an ion exchanger disposed between the mixing section and the load, for maintaining the electrical conductivity of the pure water at a predetermined value or less, said ion exchanger having a capacity of about 10 liters or more, including an ion exchanging section between an inlet hole of the brine from the mixing section and an outlet hole of the brine to the load, said ion exchanging section being filled with granular ion exchange resins, and being constructed such that the pure water passes therethrough at a sufficiently low speed so as to relieve a sudden temperature change of the pure water from the mixing section.

7. The brine supply unit of claim 1,
wherein:
the brine is pure water; and the tank is an ion exchanger disposed between the mixing section and the load, for maintaining the electrical conductivity of the pure water at a predetermined value or less, said ion exchanger having a capacity of about 10 liters or more, and being constructed such that the pure water passes therethrough at a speed of 0.011 m/s or less so as to relieve a sudden temperature change of the pure water from the mixing section.

* * * * *